March 23, 1965        J. W. HAYWOOD         3,175,078
ILLUMINATED ROOM DIVIDER
Filed May 11, 1961                          2 Sheets-Sheet 1

INVENTOR
JACK W. HAYWOOD
BY
ATTORNEY

March 23, 1965     J. W. HAYWOOD     3,175,078
ILLUMINATED ROOM DIVIDER
Filed May 11, 1961     2 Sheets-Sheet 2

INVENTOR
JACK W. HAYWOOD
BY
ATTORNEY

United States Patent Office 3,175,078
Patented Mar. 23, 1965

3,175,078
ILLUMINATED ROOM DIVIDER
Jack Woodward Haywood, Los Angeles, Calif., assignor to Modeline Company of California, Inc., Los Angeles, Calif., a corporation of California
Filed May 11, 1961, Ser. No. 109,287
7 Claims. (Cl. 240—2)

This invention relates to an illuminated screen comprising folding sections hinged together whereby the device operates as an illuminated screen, folding room divider or folding floor lamp.

The illuminating device comprises a plurality of sections, each flexibly hinged together and one or all of which are illuminated with one or more sources of illumination in such light source distribution over the folding sections as to provide optimum illuminating utility and ornamental effect as a lamp or illuminated room divider.

A first object is to provide an illuminated folding screen or room divider comprising sections hinged together with optimum arrangement and disposal of sources of illumination carried thereby.

A further object is to provide a screen or room divider of several sections hinged together which may be collected into a battery of several lamps whereby the screen or divider operates alternately as a screen or open divider illuminated to a controlled degree, or in folded condition in which the sections folded together comprise a concentrated source of illumination as an upright floor lamp comprising a folded combination of several illumination sources.

A further object is to provide a screen or room divider each with movable sources of illumination disposed in several sections, each flexibly hinged together, whereby the illumination may be manually disposed at a controlled level over large room divider area for optimum controlled ornamental and illuminating effect throughout the flexible body.

According to the present invention, highly ornamental effects are attained by hinging together illuminated frames to provide indirect lighting effects. Although the frames are hinged together, any of the frames may be easily removed from the hinged assembly or additional frames added in series. The result of additional frames added in series produces a curtain or wall ornamental effect and thereby has endless versatility.

One or more of the hinged screens has various sources of illumination, which are ornamentally shaded with circular to ovate shades of any desired curvature including uncurved or flat surfaces encompassing illumination sources such as an illuminating lamp, each comprised of transparent, translucent or opaque materials. These shades may be colored or frosted to vary the light intensity and may have ornamental designs formed in them. The shades and/or the sources of illumination may be attached to the frame such that they are movable in location or more than one may be mounted within a frame. Therefore, additional ornamental effects may be obtained through shade and illumination source position.

Although the invention contemplates the use of bulbs or tube-type incandescent lamps, fluorescent lamps may also be used. In such case, slight modifications are required in replacing the lamp socket with fluorescent terminals.

Each frame may be positioned in a plane, independent of adjacent frames, so that striking soft illumination may be visible from any frame, notwithstanding the illumination of the other frames. Therefore, when any particular frame is not illuminated by its internal lamp, it receives soft illumination from adjacent frames. Thus, striking ornamental effects may be produced as well as intensity and directional control is possible with this illuminating device.

Other objects, features and advantages of the present invention will be readily apparent from the following detailed description of certain embodiments thereof explained in connection with the accompanying drawings in which.

Figure 1:
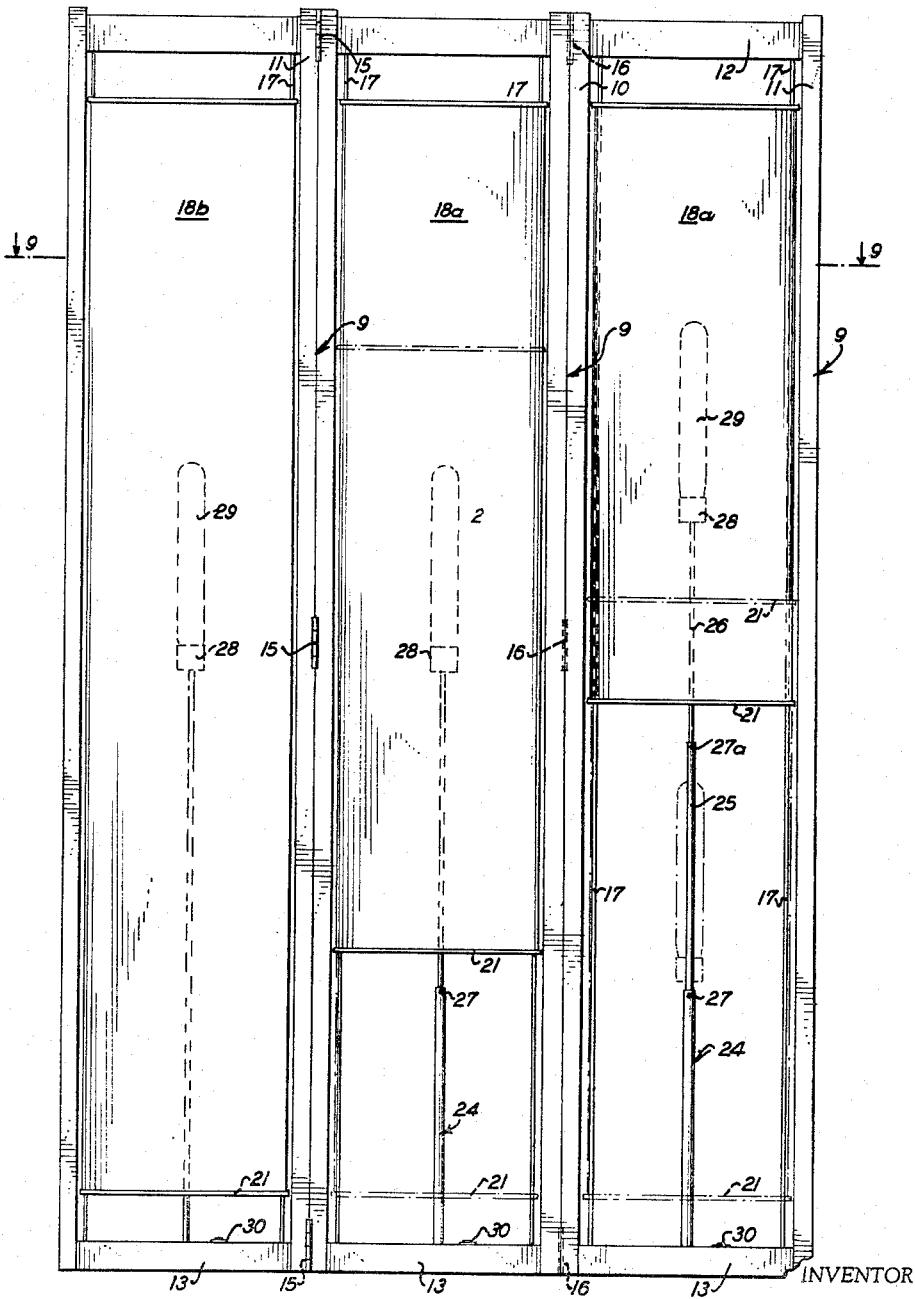
FIG. 1 is a front elevational view of a form of the room divider.

In the drawings, FIG. 1 shows the open room divider of several hinged frames 9 comprising a pair of vertical supporting members 10 and 11 which may be formed of any suitable material such as wood or metal, secured together at the top by a horizontal support member 12 and at the bottom by a horizontal base support member 13, all of which may be of the same or different materials. The frame 9 constructed from the supporting members 10 and 11 at the top 12 and base 13, may be made even from tubular metal or plastic, but ornamental wood framing is the preferred embodiment of the invention.

The frames 9 are hinged together with several vertically aligned hinges 15 between the center frame and the left hand frame of FIG. 1, the kingpins being disposed in the forward plane of the view; and by vertically aligned hinges 16 disposed between the center frame and the right hand frame 9, with the kingpins disposed to the rear of the view. There is thus provided opposite hinged movements of one screen with respect to the adjacent screen. As shown in FIGS. 2, 3, 4, 5 and 8, however, the hinges may be double hinges each allowing arcuate movement of one screen with respect to the adjacent screen in both directions.

Figure 6:
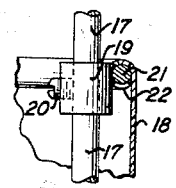
FIG. 6 is a detail in section illustrating a means for securing a shade to the lamp frame.
Figure 7:
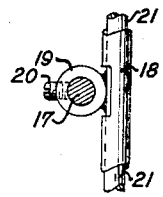
FIG. 7 is the detail of FIG. 6 in plan view.

Mounted vertically in each screen and inwardly disposed from each leg 10 and 11, are parallel rods 17, each having one end secured in the cross member 12 and the other end in cross member 13. Upper and lower bushings 19 carried by a shade are mounted to slide upon the rod 17, as shown in detail in FIGS. 6 and 7, the bushings being fastened in any selected vertical position upon the rod 17 by securing the set screw 20 therein against the rod 17.

A shade 18, rectangular or arcuate, such as ovate, in contour, has reinforcing rods 21 running peripherally around the top and bottom of each shade. The shade material at each end is bent around the rod 21 for securement as shown at 22 in the detail FIGS. 6 and 7. In this manner the shades 18 may be mounted to extend within a hinged rectangular frame 9 and is supported through bushings 19 slidably upon rods 17 for vertical sliding movement. The vertical height of each shade 18 is thus adjustable by fixing set screws 20 in the bushings 19 at any selected vertical position upon the rods 17.

As shown in FIG. 1, shade 18 in the right hand screen extends only about one half of the height of the frame 9, the center shade 18a extends about two thirds the height of the screen, and the left hand shade 18b extends almost the entire height of the screen. The shades 18, 18a and 18b are thus varied in height to illustrate that they may be varied in height either for selected shading or ornamental effect. The shades may thus be all of the shorter height 18 or of any intermediate size for optimum ornamental and light shading effect and positioned by selected mounting to desired height, and selected to extend any length within the frame, as desired. Thus, the size and mounting of the shade within a frame, the positioning of each frame with respect to another secured thereto by hinges 15 and 16, provide optimum selectivity for desired illuminating and shading effect.

Mounted within each frame and supported in a lower cross bar framing member 13 is a tubular support 24 forming a lower telescopic section fitted with a set screw 27 for fixing the height of a second telescopically assembled tubular member 25 at any preselected point above the lower frame member 13. A third tubular support member 26 comprising an upper section mounted telescopically in tubular member 25 has a socket 28 which is electrically connected by wires passing through each member 24, 25 and 26 and which supports and electrically connects an elongated light bulb 29 as a source of illumination in the frame 9. By selected setting of the set screws 27, and 27a, each support element 25 and 26 may be fixed at an adjusted height. In consequence the bulb 29 supported thereby will be adjusted to a selected height within the frame 9 and shade 18 thereabout. Such height may be either in the extended dotted line position within the right hand frame 9 or the lower dotted line position of that frame. Again, as shown in the central frame or the left hand frame of FIG. 1, the height of each bulb 29 may be the same in each screen or at a different height as selected, so that the source of illumination bulb 29 may be adjusted to various heights within each frame. For further flexibility each source of illumination is controlled by a light switch 30 so that one or all bulbs 29 may be individually or simultaneously illuminated, and each, quite flexibly, may be preset to a desired height within each screen. Furthermore, each illumination bulb 29 may have its shade disposed thereabout to a preselected height for optimum illuminating and ornamental effect.

Figure 2:
FIG. 2 is a top plan view of a modified form of an open room divider.
Figure 3:
FIG. 3 is a top plan view of the modification of the room divider of FIG. 2 in folded form.
Figure 5:
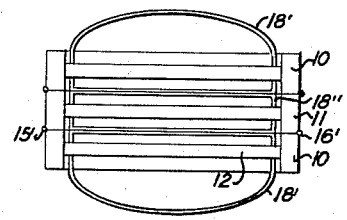
FIG. 5 is a top plan view of the room divider of FIG. 4 in folded form.
Figure 4:
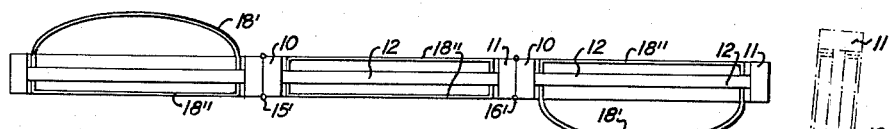
FIG. 4 is a top plan view of a second embodiment of the room divider in open form.
Figure 9:
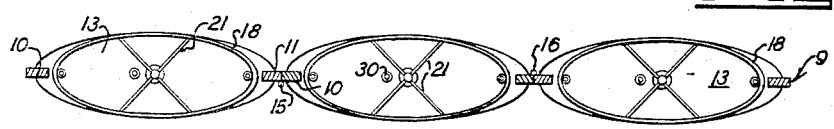
FIG. 9 is a sectional view taken on the line 9—9 of FIG. 1.

The shades may be wholly symmetrically ovate, 18, 18a and 18b, about the plane of the screen as shown in FIG. 9; or they may be wholly rectangular so that each surface lies in a flat plane as shown in FIGS. 2 and 3. With the rectangular modification of FIG. 2, each screen section may be open as shown in that figure operating as a room divider; or all of the screens may be folded, one upon the other, as shown in FIG. 3. The folded arrangement may be utilized either as a folded room divider or as a concentrated source of illumination. Therefore, one or all of the lamps 29 may provide the illumination when the unit is in the folded condition. In the folded condition of FIG. 3 for instance, the composite may be utilized as a floor lamp of a form in which each folded screen lies flush, one surface against another. That form is reached by folding the hinges, the left hand forward and the right hand to the rear, according to the hinged position in the structure shown in FIG. 1.

Figure 8:
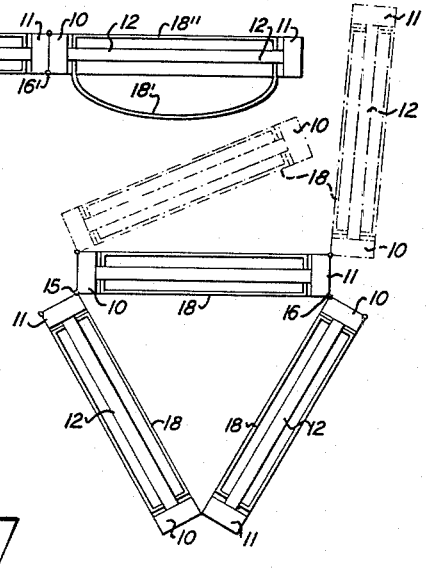
FIG. 8 is a plan view illustrating a folded arrangement of FIG. 2 by the present invention.

When double hinges are used, each section can be folded into a triangular concentrated assembly as shown in FIG. 8 or into any other desired position as shown in dotted line positions of some of the screens of FIG. 8, whereby the light is not only concentrated or dispersed, but may be oriented in any direction desired with great flexibility.

In the form shown in FIG. 9 with all of the screens ovate, it is not possible to fold them subsequently one upon the other to the form of FIG. 3. It is often useful for the purpose both for securing close folding while maintaining some of the ovate shade structure, for improved ornamental effect as well as close folding, to make only a portion of a shade ovate with another portion flat or rectangular. For instance, referring to FIG. 4, the right hand shade has one surface arcuate 18' and the opposite surface 18" of the same screen section is flat. The center screen has both surfaces 18" flat. The left hand screen again has both arcuate 18' and flat 18" surfaces, but their positions are inverted with respect to the right hand screen. These, then, may be folded in the form shown in FIG. 5. The center screen having both shade surfaces 18 flat complements each of the flat end screen surfaces 18", allowing exposure of both remaining arcuate surface screens being closely folded as shown and presenting an entirely round contour for improved appearance and desirable shaded illumination.

As thus described, various shaped shades are mounted in hinged screens, each enclosing a source of illumination, the sources and shades being variably placed and shaped for optimum foldable screen illumination and ornamental effect, useful as a foldable room divider and as a foldable floor lamp.

The source of illumination, shown as an illuminating bulb may be either a conventional incandescent bulb, or may be further substituted by an iluminating fluorescent light and may be provided with the necessary ballast elements (not shown). The shading materials may be of plastic, fabric or glass of continuous or woven materials, as desired.

I claim:

1. An illuminating room divider and floor lamp comprising several vertically sustaining substantially plane framing elements, each hinged at a contiguous vertical edge to the next for folding arcuate movement of one element with respect to the next, whereby the assembly may be extended as a room divider comprising a continuous wall plane panel or folded into a compact group of frames by the arcuate hinged movement of said framing elements, at least one framing element having an open central area in which the framing element encloses and supports a source of illumination and a light transmissive shading element thereabout, said shading element having wide lateral light emissive surfaces extending over a large lateral portion of said open framing element area and protruding laterally beyond the plane of said framing element an insufficient distance to interfere with the substantial arcuate movement of one framing element and shade therein with the next.

2. The illuminating room divider and floor lamp as defined in claim 1 including a source of illumination and one of said shading means in each framing element.

3. The illuminating room divider and floor lamp as defined in claim 1, said source of illumination comprising an elongated fluorescent tube mounted vertically in said open central area of said framing element and providing a source of illumination extending a corresponding vertical distance of its length within said framing element.

4. The illuminating room divider and floor lamp as defined in claim 1 wherein each shading means is ovate in horizontal section and sized to fill the space between the bounding vertical edges of said framing elements in its longer axis and to extend said insufficient distance laterally of the plane of said frame in its shorter axis.

5. The illuminating room divider and floor lamp as defined in claim 1 including means for adjusting the vertical position of at least some of said illumination sources within their supporting frames.

6. The illuminating room divider and floor lamp as defined in claim 1 including means for adjusting the vertical position of the illuminating source and shading means within its supporting frame.

7. The illuminating room divider and floor lamp as defined in claim 1 wherein each framing element is supported in a base having sufficient width to provide vertical support stability in open and folded position of the several framing elements and each frame carries a vertical elongated source of illumination surrounded by a correspondingly long light transmissive shading means.

References Cited by the Examiner
UNITED STATES PATENTS

| | | | |
|---|---|---|---|
| 512,333 | 1/94 | Simmer | 160—351 X |
| 1,538,198 | 5/25 | Manchester | 240—4 |
| 1,802,528 | 4/31 | Petrolo | 240—4 |
| 1,838,734 | 12/31 | Beecher | 240—10 |
| 1,919,114 | 7/33 | Ley. | |
| 2,053,732 | 9/36 | Nelson | 240—4 |
| 2,602,252 | 7/52 | Shinn | 240—81 X |
| 2,792,491 | 5/57 | Rand | 240—4 |
| 2,853,598 | 9/58 | Balthauser | 240—81 X |
| 2,900,496 | 8/59 | Williams | 240—144 X |

OTHER REFERENCES

German application 1,100,563, March 2, 1961.

NORTON ANSHER, *Primary Examiner.*
GEORGE NINAS, Jr., *Examiner.*